(12) United States Patent
Qiao et al.

(10) Patent No.: US 7,921,146 B2
(45) Date of Patent: Apr. 5, 2011

(54) APPARATUS, SYSTEM, AND METHOD FOR INTERPOLATING HIGH-DIMENSIONAL, NON-LINEAR DATA

(75) Inventors: Yue Qiao, Longmont, CO (US); Michael Joseph Kirby, Fort Collins, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1521 days.

(21) Appl. No.: 11/263,740

(22) Filed: Nov. 1, 2005

(65) Prior Publication Data

US 2007/0097965 A1    May 3, 2007

(51) Int. Cl.
*G06F 7/38* (2006.01)
*H04N 1/46* (2006.01)

(52) U.S. Cl. ...................... 708/290; 358/525
(58) Field of Classification Search ............. 358/525; 370/376
See application file for complete search history.

(56) References Cited

U.S. PATENT DOCUMENTS

| | | | | |
|---|---|---|---|---|
| 5,566,002 | A * | 10/1996 | Shikakura | 358/426.09 |
| 5,731,989 | A * | 3/1998 | Tenny et al. | 358/1.9 |
| 6,118,549 | A * | 9/2000 | Katougi et al. | 358/1.9 |
| 6,636,628 | B1 * | 10/2003 | Wang et al. | 382/167 |
| 6,751,348 | B2 | 6/2004 | Buzuloiu et al. | 382/165 |
| 6,758,574 | B1 | 7/2004 | Roberts | 362/162 |
| 6,775,417 | B2 | 8/2004 | Hong et al. | 382/253 |
| 6,798,539 | B1 | 9/2004 | Wang et al. | 358/1.9 |
| 2002/0010691 | A1 * | 1/2002 | Chen | 706/20 |
| 2002/0051145 | A1 | 5/2002 | Watanabe et al. | 358/1.9 |
| 2002/0087538 | A1 | 7/2002 | Abdel-Mottaleb et al. | 707/6 |
| 2002/0140985 | A1 | 10/2002 | Hudson | 385/3.23 |
| 2002/0191034 | A1 * | 12/2002 | Sowizral et al. | 345/854 |
| 2003/0072473 | A1 * | 4/2003 | Livens et al. | 382/112 |
| 2003/0086104 | A1 | 5/2003 | Chen | 358/1.9 |
| 2004/0036765 | A1 | 2/2004 | Manbeck et al. | 348/96 |
| 2004/0130546 | A1 * | 7/2004 | Porikli | 345/423 |

FOREIGN PATENT DOCUMENTS

WO    WO 02095534 A2 * 11/2002

OTHER PUBLICATIONS

Author: Augen Date:Aug. 27, 2004 Title:"Bioinformatics in the Post-Genomic Era Genome, Transcriptome, Proteome, and Information-Based Medicine" Publisher: Addison-Wesley Professional Pertinent: Ch5, Sect.4—three paragraphs about K-Means Clustering URL: http://proquest.safaribooksonline.com/0321173864/ch05#X2ludGVybmFsX1NIY3Rpb25Db250ZW50P3htbGI.*
Author: Fisher; Title: "Iterative Optimization and Simplification of Hierarchical Clusterings"; Date: Apr. 1996; URL: http://arxiv.org/PS_cache/cs/pdf/9604/9604103v1.pdf.*

(Continued)

*Primary Examiner* — Chuong D Ngo
(74) *Attorney, Agent, or Firm* — Duft Bornsen & Fishman, LLP

(57) ABSTRACT

An apparatus, system, and method are disclosed for interpolating data. A cluster module locates a plurality of variable granularity data clusters within a source data set using a center selection/clustering algorithm. A conversion selection module selects a conversion function for converting each data cluster. A norm selection module selects a norm function for each data cluster. An interpolation module converts each data cluster. In one embodiment, a cross validation module iteratively cross validates and optimizes the data conversions.

14 Claims, 7 Drawing Sheets

OTHER PUBLICATIONS

Author: Yona; Title: "Methods for Global Organization of the Protein Sequence Space"; Pertinent Section: Chapter 5—"Data Clustering"; Date: 1999; URL: http://biozon.org/people/golan/.*

Cha, I.; Kassam, S.A.; "Nonlinear Color Image Restoration Using Extended Radial Basis Function Networks", IEEE 1996, pp. 3402-3405.

Mulgrew Bernard, "Applying Radial Basis Functions", IEEE Signal Processing Magazine, Mar. 1996, pp. 50-65.

Arakawa et al., "Optimum Design Using Radial Basis Function Networks by Adaptive Range Generic Algorithms", IEEE 2000, pp. 1219-1224.

* cited by examiner

APPARATUS, SYSTEM, AND METHOD FOR INTERPOLATING HIGH-DIMENSIONAL, NON-LINEAR DATA

BACKGROUND OF THE INVENTION

1. Field of the Invention

This invention relates to interpolating data and more particularly relates to interpolating data using variable-granularity sub-sets.

2. Description of the Related Art

A data set is often interpolated from a first format to a second format. Formats may include a device-independent color space such as the CIELAB standard developed by the Commission Internationale de L"Eclairage or printer specific color space data. Interpolation from the first format to the second format is particularly difficult for high-dimensional, non-linear scatter ("HNS") data such as color data.

For example, device-independent color space source data is typically interpolated to printer specific color space data by subdividing the source data set into a plurality of sub-sets and interpolating the data for each sub-set using one or more linear conversion functions. The interpolation effectiveness improves as finer granular sub-sets are employed.

Unfortunately, a single linear conversion function typically does not generate an optimum interpolation for each sub-set. To compensate for sub-optimal interpolations of sub-sets, one or more of a plurality of conversion functions may be selected for each sub-set, optimizing the interpolation for each sub-set. Unfortunately, the converted sub-sets may not combine optimally to form a target data set as the fine granularity of the sub-sets needed to optimize the conversion for each sub-set results significant interpolation inconsistencies among the converted sub-sets.

From the foregoing discussion, it should be apparent that a need exists for an apparatus, system, and method that interpolates data using variable granularity sub-sets and interpolation functions optimized for each sub-set. Beneficially, such an apparatus, system, and method would improve the effectiveness of data interpolation.

SUMMARY OF THE INVENTION

The present invention has been developed in response to the present state of the art, and in particular, in response to the problems and needs in the art that have not yet been fully solved by currently available data interpolation methods. Accordingly, the present invention has been developed to provide an apparatus, system, and method for interpolating data that overcome many or all of the above-discussed shortcomings in the art.

The apparatus to interpolate is provided with a computation module containing a plurality of modules configured to functionally execute the necessary steps of locating a plurality of data clusters, selecting a conversion function, selecting a norm function such as a weighted norm function, and converting each data cluster. These modules in the described embodiments include a cluster module, a conversion module, a norm selection module, and an interpolation module. In addition, the apparatus may include a combination module, a weight module, a cross validation module, and a drift module.

The cluster module locates a plurality of data clusters within a source data set using a center selection/clustering algorithm. Each data cluster comprises a center and a radius. Each data cluster is located to maximize the increment of data cluster elements to the explained variance. In addition, each data cluster is located to avoid numerical ill-conditioning problems for the elements encompassed by the data cluster. The cluster module further locates each data cluster to minimize the number of data clusters.

The conversion selection module selects a conversion function for converting the data of each data cluster. The conversion selection module may select a conversion function for each data cluster. In one embodiment, the conversion module selects one or more conversion function for each data cluster. The norm selection module selects a norm function for each data cluster. The weight module determines a weight for each data cluster of each conversion function. The interpolation module converts each data cluster using the selected conversion function and the selected norm function.

In one embodiment, the cross validation module iteratively cross validates and optimizes the data conversions. The cross validation module may direct the cluster module to relocate data clusters, direct the conversion selection module to select an alternate conversion function, direct the norm selection module to select an alternate norm function, and direct the weight module to modify the weight assigned to a data cluster for each conversion function in order to optimize the data interpolations.

In one embodiment, the combination module combines the converted data of each converted data cluster. The converted data from each conversion function is multiplied by the weight of each data cluster for that conversion function and summed to form a weighted sum of converted data. The apparatus interpolates data such as HNS data using variable granularity data clusters and functions optimized for each data cluster.

A system of the present invention is also presented to interpolate data. The system may be embodied in a computer system. In an alternate embodiment, the system is embodied in a printer. In particular, the system, in one embodiment, includes a source data set, and a computation module.

In one embodiment, the computation module may comprise a computer. In an alternate embodiment, the computation module comprises a printer. The computation module locates a plurality of data clusters within the source data set using a center selection/clustering algorithm, selects a conversion function for each data cluster, selects a norm function for each data cluster, and converts the source data of each data cluster to a target data set comprising converted data. In one embodiment, the source data set comprises color space data and the computation module converts the color space data of a source data set to target color data set for a specified printer.

A method of the present invention is also presented for interpolating data. The method in the disclosed embodiments substantially includes the steps necessary to carry out the functions presented above with respect to the operation of the described apparatus and system. In one embodiment, the method includes locating a plurality of data clusters, selecting a conversion function, selecting a norm function, and converting each data cluster. The method also may include determining a weight for each data cluster of each conversion function, iteratively cross validating and optimizing the converted data, combining the converted data, and adjusting conversion parameters to compensate for device drift.

A cluster module locates a plurality of data clusters within a source data set using a center selection/clustering algorithm. A conversion selection module selects a conversion function for converting each data cluster. A norm selection module selects a norm function for each data cluster. In one embodiment, a weight module determines a weight for each data cluster of each conversion function.

An interpolation module converts each data cluster. In a certain embodiment, a cross validation module iteratively employs a function such as a visual color difference equation as an error control. The cross validation module may optimize conversion parameters including the center selection/clustering algorithm, conversion function, norm functions, and weights. In one embodiment, the validation module cross validates and optimizes the conversion parameters off-line.

A combination module may combine the converted data of each converted data cluster. In one embodiment, a drift module adjusts the conversion parameters to compensate for device drift such as changes in a printer's rendered output. The drift module may adjust the conversion parameters responsive to operator input.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention converts data using variable granularity data clusters and interpolation functions optimized for each data cluster. In addition, the present invention improves the interpolation of data such as HNS data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
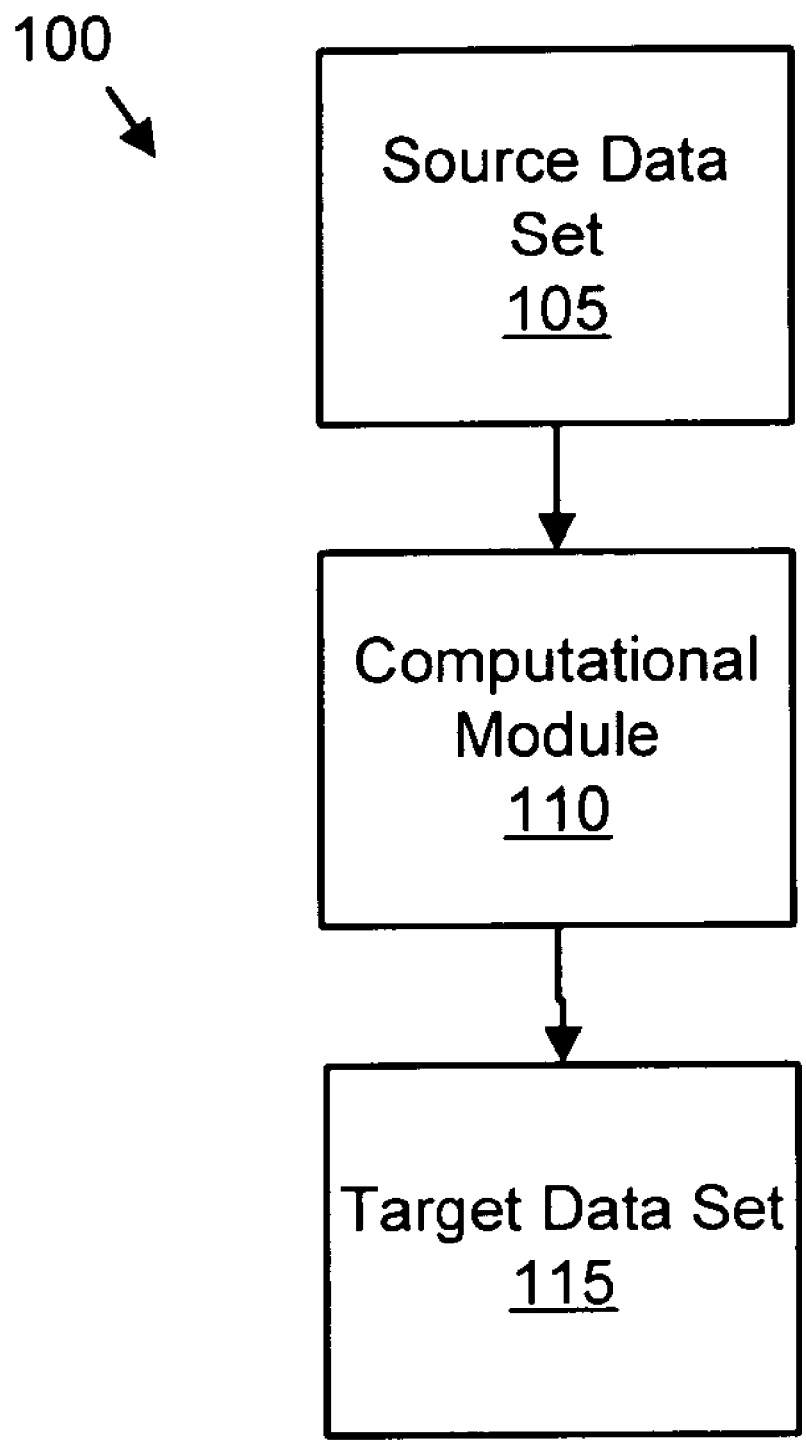
FIG. 1 is a schematic block diagram illustrating one embodiment of a data interpolation system in accordance with the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data interpolation system 100 of the present invention. The system 100 includes a source data set 105, a computation module 110, and a target data set 115. The source data set 105 may comprise HNS data. In a certain embodiment, the source data set 105 comprises color space data.

The computation module 110 interpolates the source data set 105 to the target data set 115. In one embodiment, the target data set 115 is color space data such as color space data specific to a printer. Source data set 105 data may be organized as multidimensional vector elements. In addition, target data set 115 data may also be organized as multidimensional vector elements. In one embodiment, the computation module 110 is a computer. In an alternate embodiment, the computation module 110 comprises the printer.

The computation module 110 locates a plurality of data clusters within the source data set 105 data using a center selection/clustering algorithm. In addition, the computation module 110 selects a conversion function for each data cluster. The computation module 110 further selects a norm function for each data cluster, and converts the data of each data cluster to the target data 115 set comprising converted data.

Figure 2:
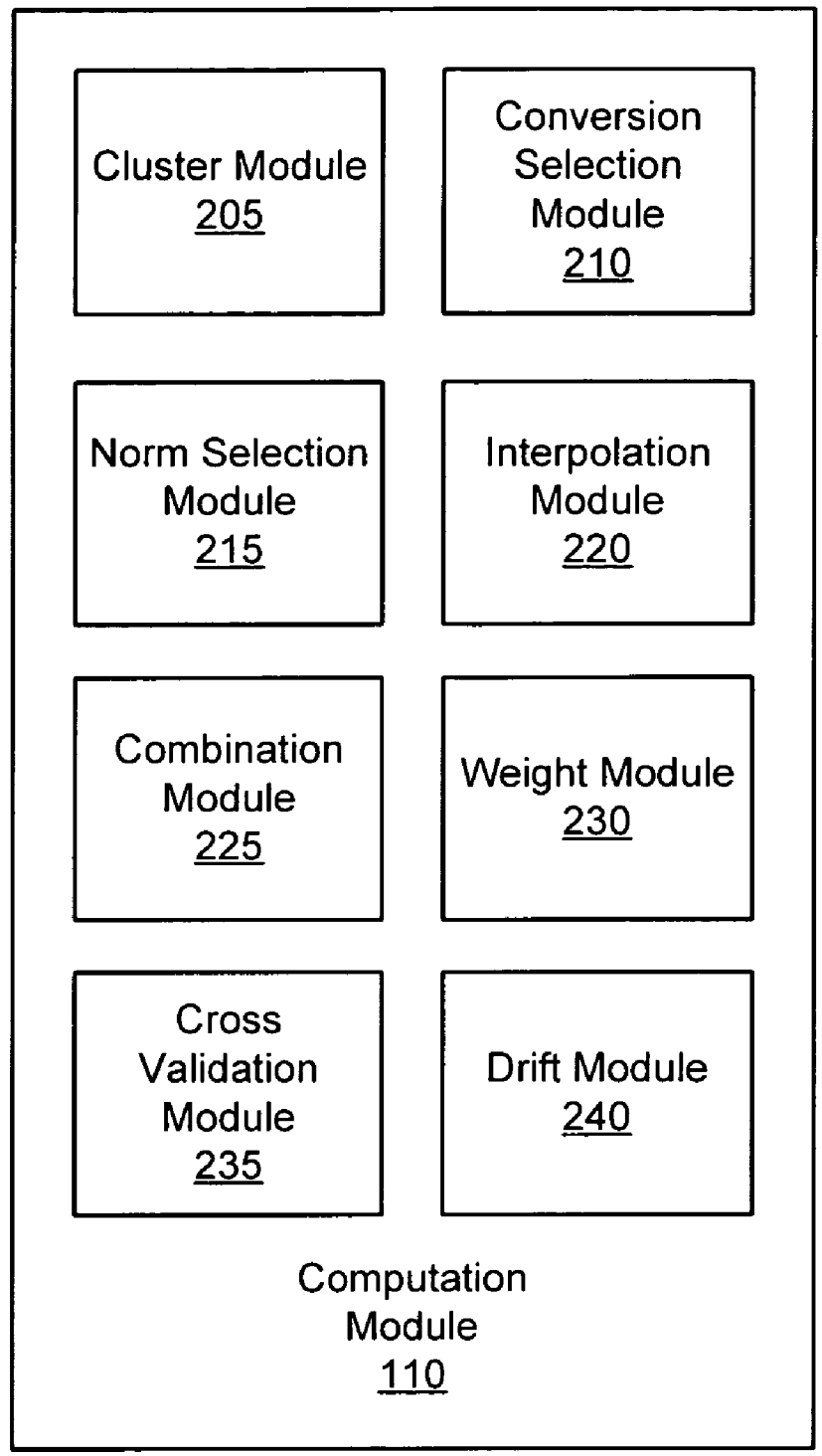
FIG. 2 is a schematic block diagram illustrating one embodiment of a computation module of the present invention.

FIG. 2 is a schematic block diagram illustrating one embodiment of a computation module 110 of the present invention. In the depicted embodiment, the computation module 110 is the computation module 110 of FIG. 1. The computation module 110 includes a cluster module 205, a conversion module 210, a norm selection module 215, an interpolation module 220, a combination module 225, a weight module 230, a cross validation module 235, and a drift module 240.

The cluster module 205 locates a plurality of data clusters within a source data set 105 with a center selection/clustering algorithm. Each data cluster comprises a center expressed as a multidimensional vector element and a multidimensional radius. The cluster module 205 locates each data cluster to maximize the interval of the explained variance between each element of the data cluster and the data cluster. The granularity of the data clusters may vary according to characteristics of the source data set 105 and regions of elements within the source data set 105. In addition, the cluster module 205 locates each data cluster to avoid numerical ill-conditioning problems for the elements encompassed by the data cluster. The cluster module 205 further locates each data cluster to minimize the number of data clusters.

In one embodiment, the cluster module 205 locates the data clusters/centers using an orthogonal least squares algorithm, a non-linear optimization, or a K-mean algorithm. In a certain embodiment, the cluster module 205 uses a combination of algorithms to locate the data clusters/centers.

The conversion selection module 210 selects a conversion function for converting the data of each data cluster. In one embodiment, the conversion module 210 selects a Gaussian conversion function. The conversion module 210 may also select a gradient descent function, a linear function, a cubic function, a thin plate spline function, a multiquadric, and an inverse multiquadric function.

The norm selection module 215 selects a norm function for each data cluster. The weight module 230 determines a weight for each data cluster of each conversion function. The weight module 230 may determine the weights using a weight algorithm such as a linear algorithm singular value decomposition ("SVD") or a nonlinear algorithm such the Broyden-Fletcher-Goldfarb-Shanno ("BFGS") nonlinear algorithm. The weight module 230 may also use specified weights for each combination of conversion functions or set of conversion functions such as weights specified in a table of possible conversion function combinations.

The interpolation module 220 converts each data cluster using the conversion function and the norm function. In one embodiment, the interpolation module 220 applies the norm function and the conversion function to each element of each data cluster, interpolating one or more elements of the source data set 105 to one or more corresponding elements of the target data set 115.

In one embodiment, the cross validation module 235 cross validates the data conversions. The cross validation module 235 may further direct the cluster module 205 to relocate data clusters to optimize the data conversions. In addition, the cross validation module 235 may direct the conversion selection module 210 to select an alternate conversion function, the norm selection module 235 to select an alternate norm function, and the weight module 230 to modify the weight assigned to each data cluster of each conversion function to optimize data conversions. As used herein, the location of centers, data cluster algorithms, conversion functions, norm functions, and weights are collective referred to as conversion parameters. In a certain embodiment, the cross validation module 235 iteratively directs modifications and cross validates data interpolations until the data interpolation is optimized.

In one embodiment, the combination module 225 combines the converted data of each converted data cluster to form the target data set 115. The combination module 225 may use the weights assigned by the weight module to combine the converted data from one or more conversion functions as a sum of products of weights and converted data. The computation module 110 converts data such as HNS data using variable granularity data clusters and functions optimized for each data cluster.

Figure 3:
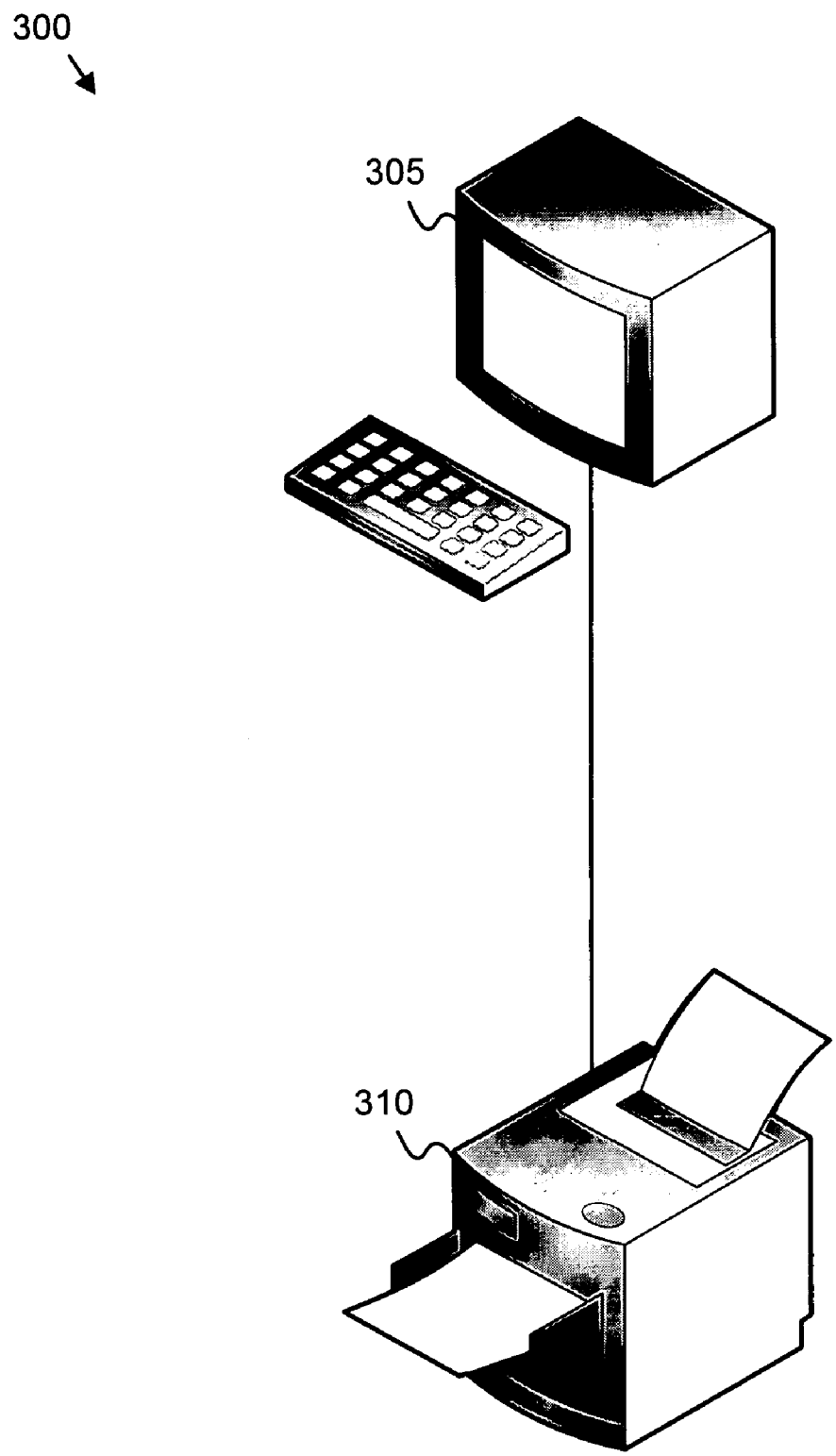
FIG. 3 is a schematic block diagram illustrating one embodiment of a color data interpolation system of the present invention.

FIG. 3 is a schematic block diagram illustrating one embodiment of a color data interpolation system 300 of the present invention. The system 300 includes a computer 305 and a printer 310. In one embodiment, the computer 305 comprises the computation module 110 of FIG. 2. In an alternate embodiment, the printer 310 comprises the computation module 110 of FIG. 2.

In one embodiment, the system 300 interpolates or converts data including HNS data. The data may include color space data such as device-independent color space data. The system 300 may interpolate the data for rendering on the printer 310.

In one embodiment, the system 300 performs a general off-line conversion of data. For example, the system 300 may convert device-independent color space data residing on the computer 305 to printer 310 specific color data. The system 300 may perform the conversion off-line and store the converted data in a target data set 115. The system 300 may further use the converted data to convert on-line additional data such as print data.

In a certain embodiment, the system 300 may receive operator input such as through the computer 305. The system 300 may adjust conversion parameters used to convert data responsive to the operator input.

Figure 4:
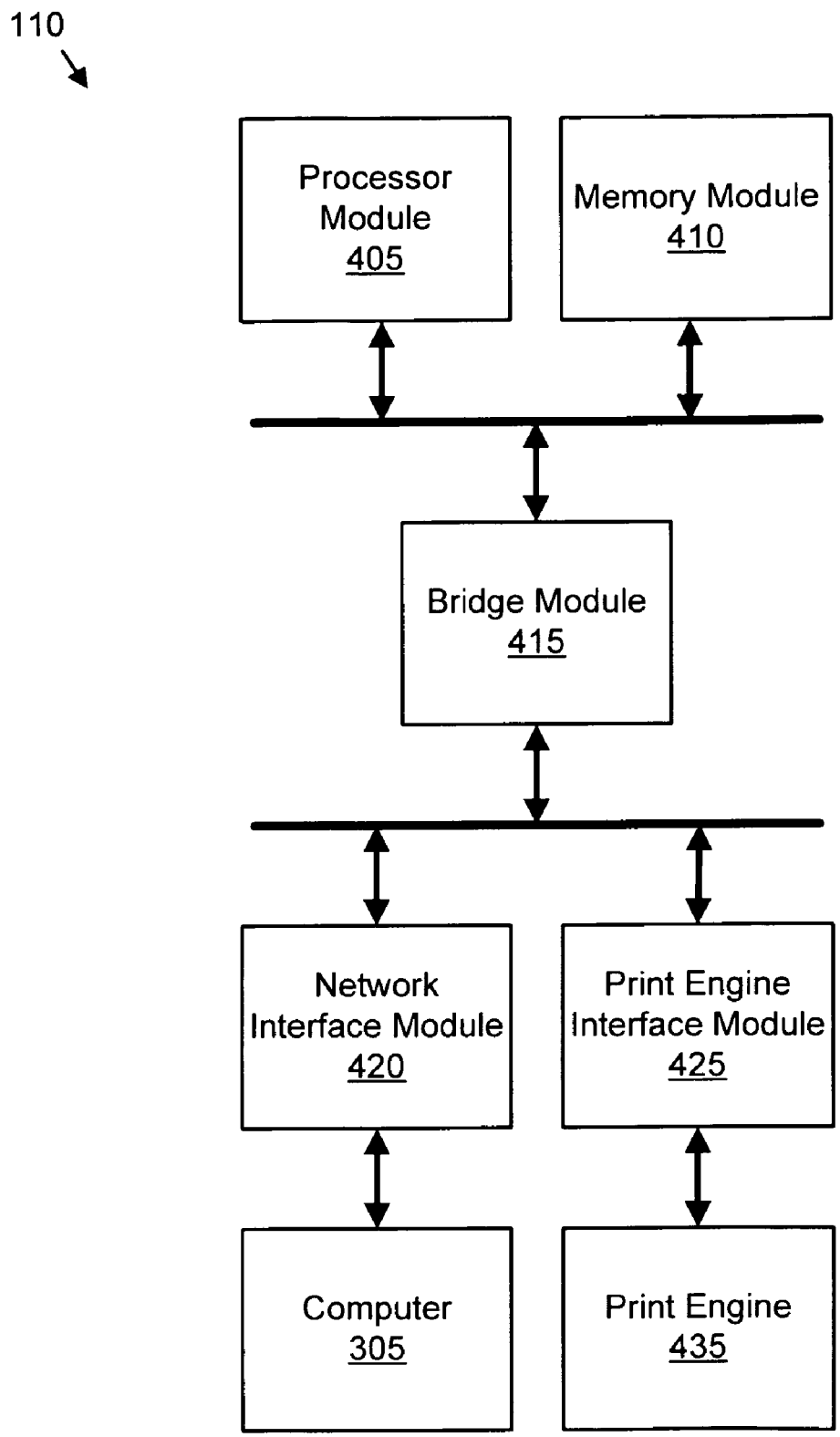
FIG. 4 is a schematic block diagram illustrating one embodiment of a computation module of the present invention.

FIG. 4 is a schematic block diagram illustrating one embodiment of a computation module 110 of the present invention. The computation module 110 is the computation module 110 of FIG. 2. The depicted computation module 110 is comprised in the printer 310 of FIG. 3. However, the computation module 110 may also be comprised in the computer 305 of FIG. 3. The computation module 110 includes a processor module 405, a memory module 410, a bridge module 415, a network interface module 420, a print engine interface module 425, a computer 306, and a print engine 435.

The processor module 405, memory module 410, bridge module 415, network interface module 420, and print engine interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the network interface module 420, and the print engine interface module 425 may be through semiconductor metal layers, substrate to substrate wiring, or circuit card traces or wires connecting the semiconductor devices.

The memory module 410 stores software instructions and data. The processor module 405 executes the software instructions and manipulates the data as is well know to those skilled in the art. The processor module 405 communicates with the network interface module 420 and the print engine interface module 425 through the bridge module 415.

The processor module 405 may execute and the memory module 410 may store software instructions comprising the cluster module 205, the conversion selection module 210, the norm selection module 215, the interpolation module 220, the combination module 225, the weight module 230, the cross validation module 235, and the drift module 240. In addition, the memory module 410 may receive and store a source data set 105 from the computer 305 through the network interface module 420 and the bridge module 415. The memory module 410 may further interpolate the source data set 105 and store the converted data in the memory module 410 as a target data set 115.

Figure 5:
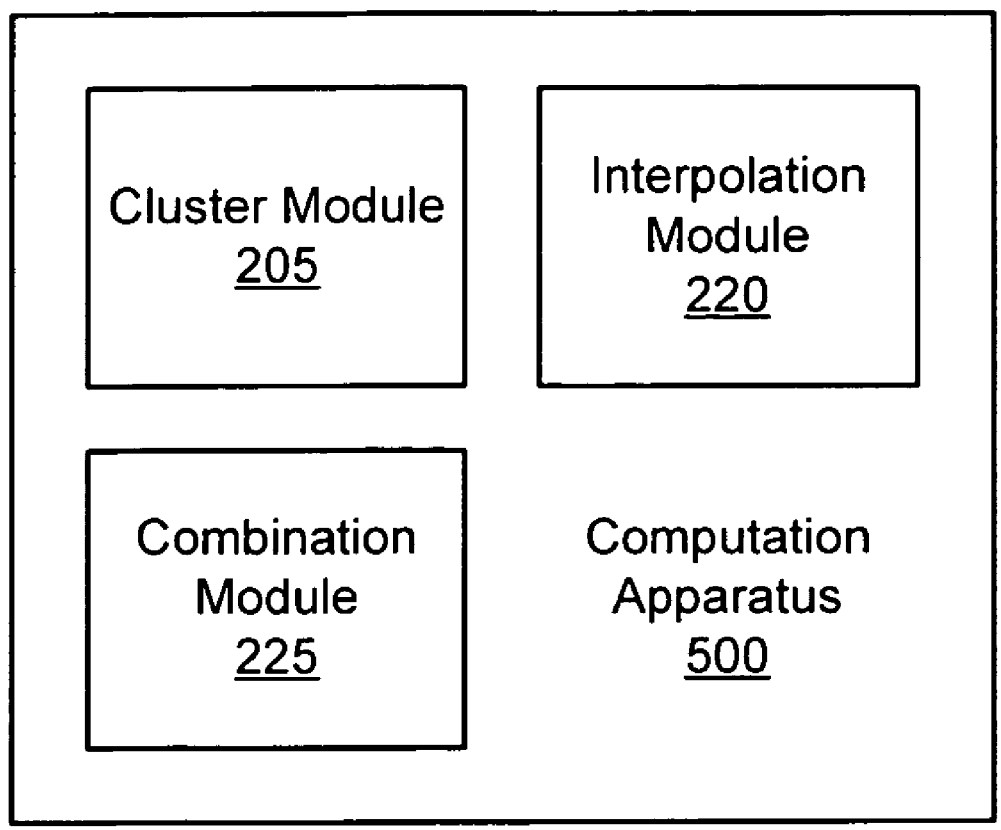
FIG. 5 is a schematic block diagram illustrating one embodiment of an alternate computation apparatus of the present invention.

FIG. 5 is a schematic block diagram illustrating one embodiment of an alternate computation apparatus 500 of the present invention. The alternate computation apparatus 500 may be the computation module 110 of FIG. 1. In the depicted embodiment, the apparatus 500 includes a cluster module 205, an interpolation module 220, and a combination module 225.

The cluster module 205 locates a plurality of data clusters within a source data set 105 using a center selection/clustering algorithm. The granularity of each data cluster may vary. The cluster module 205 locates each data cluster to maximize the increment to the explained variance between the elements encompassed by the data cluster and the data cluster, avoid numerical ill-conditioning problems for the elements, and to minimize the number of data clusters.

The interpolation module 220 converts each data cluster using a specified conversion function and a specified norm function. In one embodiment, the interpolation module 220 applies the norm function and the conversion function to each element of each data cluster, interpolating one or more elements of the source data set 105 to one or more corresponding elements of a target data set 115.

The combination module 225 combines the converted data of each converted data cluster. The apparatus 500 converts data such as HNS data using variable granularity data clusters.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
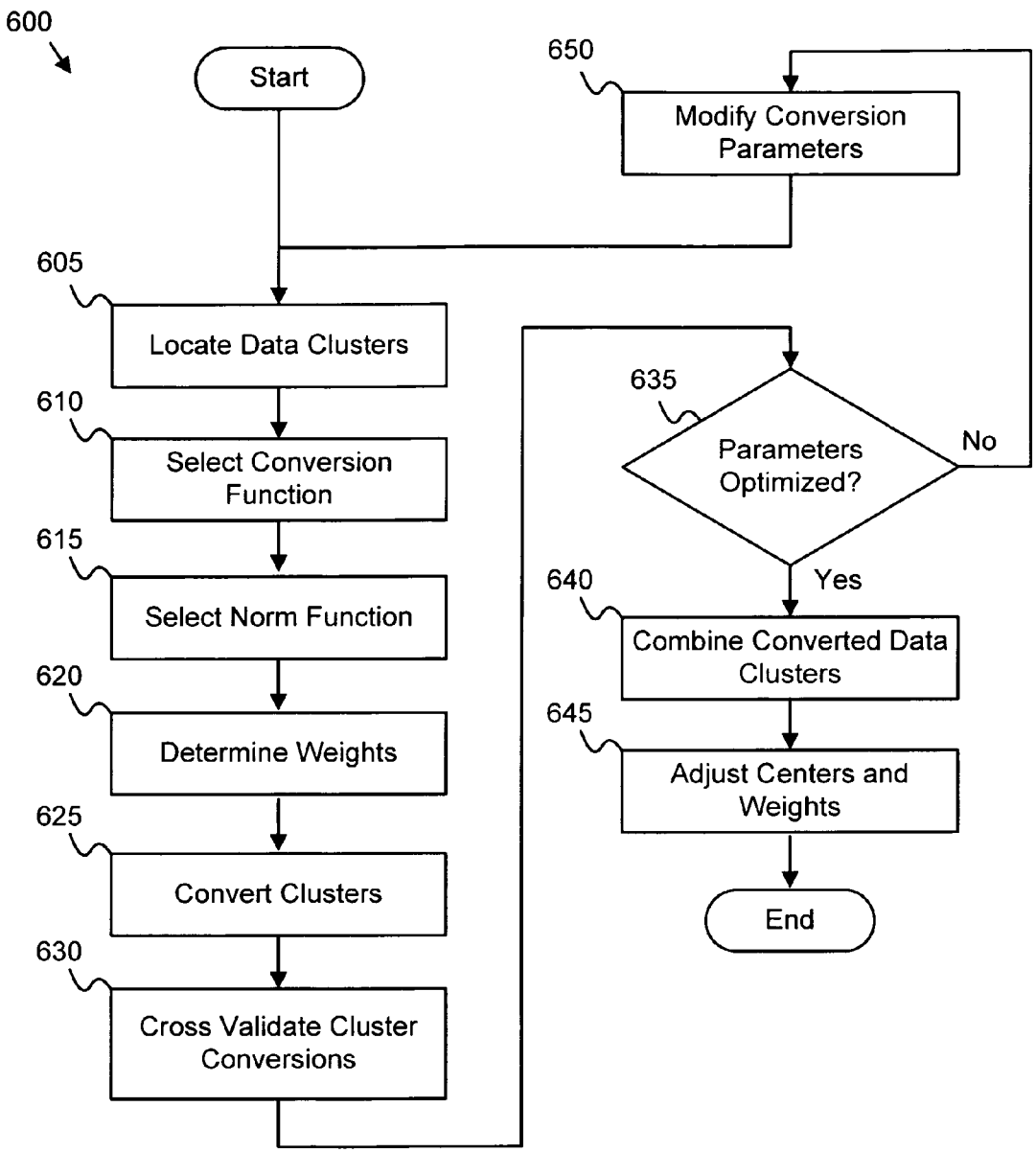
FIG. 6 is a schematic flow chart diagram illustrating one embodiment of a data interpolation method in accordance with the present invention.

FIG. 6 is a schematic flow chart diagram illustrating one embodiment of a data interpolation method 600 of the present invention. A cluster module 205 locates 605 a plurality of data clusters/centers with a center selection/clustering algorithm. In one embodiment, the cluster module 205 locates 605 the data clusters using an orthogonal least squares algorithm as is well known to those skilled in the art.

In an alternate embodiment, the cluster module 205 locates the data clusters using a K-mean algorithm. For example, the cluster module 205 may employ the K-mean algorithm by selecting a center of the data cluster and a radius, determining the distance from the center to each element of the data cluster comprised by the radius, grouping each element based on minimum distance, and iterating until no element moves groups. In a certain embodiment, the cluster module 205 locates the data clusters using a non-linear optimization algorithm.

A conversion selection module 210 selects 610 a conversion function for converting each data cluster. In one embodiment, the conversion selection module 210 selects a Gaussian function. Equation 1 illustrates a Gaussian function where r is the radius to an element from a data cluster center and $\sigma$ is the radius of the data.

$$\Phi(r) = e^{(-r^2/\sigma^2)} \qquad \text{Equation 1}$$

In certain embodiment, the conversion selection module 210 selects 610 a linear function. Equation 2 illustrates a liner function.

$$\Phi(r) = r \qquad \text{Equation 2}$$

The conversion module 210 may also select 610 a cubic function, a think plate spline, a logistic basic function, a multiquadric function, and an inverse multiquadric.

Equation 3 illustrates a cubic function and Equation 4 illustrates a think plate spline function. In addition, Equation 5 shows a multiquadric function, and Equation 6 illustrates an inverse multiquadric function.

$$\Phi(r) = r^3 \qquad \text{Equation 3}$$

$$\Phi(r) = (r/\sigma)^2 \log(r/\sigma) \qquad \text{Equation 4}$$

$$\Phi(r) = \sqrt{r^2 + \sigma^2} \qquad \text{Equation 5}$$

$$\Phi(r) = 1/\sqrt{r^2 + \sigma^2} \qquad \text{Equation 6}$$

A norm selection module 215 selects 615 a norm function for each data cluster. In one embodiment, the norm selection module 215 selects 615 a L–p function where p is any real number. For example, the norm selection module 215 may select a L–1 norm function, a L–2 norm function, or a L infinity norm function. The norm function may operate on a plurality of elements $x_k$ each configured as a vector specified by k from the center to a specified element and where the data cluster comprises n elements. Equation 7 illustrates a multidimensional vector element $x_k$.

$$x_k = \begin{bmatrix} x_1 \\ x_2 \\ \vdots \\ x_m \end{bmatrix} \qquad \text{Equation 7}$$

Equation 8 illustrates a L–p function where p is a real number.

$$|x|_p = \left( \sum_{k=1}^{n} |x_k|^p \right)^{1/p} \qquad \text{Equation 8}$$

If |x| is the L–p norm of Equation 8, the norm selection module 215 may also select 615 a weighted L–p norm function by applying |Cx| where C is any nonsingular matrix. In one embodiment, a weight module 230 determines 620 a weight for each data cluster of each conversion function. The weight module 230 may determine 620 the weight for each data cluster from a table of specified weights for each potential combination of conversion functions. In an alternate embodiment, the weight module 230 may iteratively optimize the weights from specified original values.

An interpolation module 220 converts 625 each data cluster using the selected conversion function, generating converted data for a specified data cluster. In one embodiment, the interpolation module 220 converts 625 each data cluster using two or more selected conversion functions generating converted data for each conversion function of each data cluster.

In a certain embodiment, a cross validation module 235 cross validates 630 the data conversions. The cross validation module 235 may employ a function such as a visual color difference equation as an error control. If the cross validation module 235 determines 635 that the data conversions are not optimized, the cross validation module 235 may modify 650 the conversion parameters. For example, the cluster module 205 may again locate 605 a plurality of data clusters with a center selection/clustering algorithm including in one embodiment a modified center selection/clustering algorithm center selection/clustering algorithm. In addition, the conversion selection module 210 may select 610 the conversion function employing one or more modified constants or functions, the norm selection module 215 may select the norm function using one or more modified constants or functions, and the weight module 230 may determine 620 a weight for each data cluster of each conversion function employing one or more modified constants, functions, or tables. In one embodiment, the validation module 235 cross validates 630 and optimizes 650 the conversion parameters off-line.

If the cross validation module 235 determines 635 the conversion parameters are optimized, a combination module 225 may combine 640 the converted data of each converted data cluster. In one embodiment, the combination module 225 combines the converted data for each element as a sum of products of the converted data for each conversion function and the weight for each data cluster of each conversion function. For example, Equation 9 illustrates combining the converted data for a selected element $x_k$ for each of n conversion functions where p(x) is a polynomial of up to degree k, $w_i$ is the weight of a each data cluster for each conversion function, and $\Phi$ is the converted data from the conversion function.

$$f(x) = p(x) + \sum_{i=1}^{N} w_i * \Phi(\|x - x_i\|) \quad \text{Equation 9}$$

In one embodiment, a drift module 240 adjusts 645 the conversion parameters to compensate for device drift such as changes in a printer's rendered output. In one embodiment, the drift module 240 adjusts 645 the conversion parameters on-line. The drift module 240 may adjust 645 the conversion parameters responsive to operator input. For example, an operator may enter one or more compensation parameters based on observations, analysis, or measurements to a computer 305. The drift module 240 may adjust 645 one or more conversion parameters responsive to the compensation parameters. The method 600 converts data such as HNS data using variable granularity data clusters and functions optimized for each data cluster.

Figure 7:
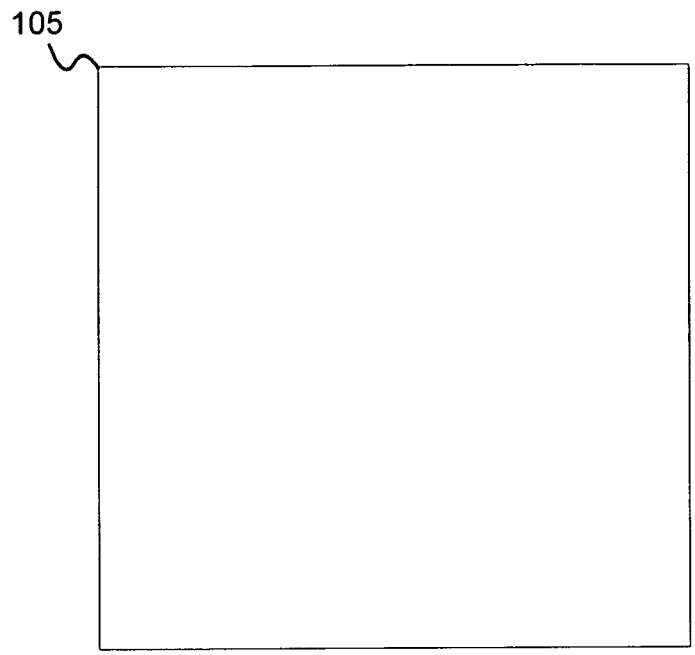
FIG. 7 is a schematic drawing illustrating one embodiment of source data set of the present invention.
Figure 8:
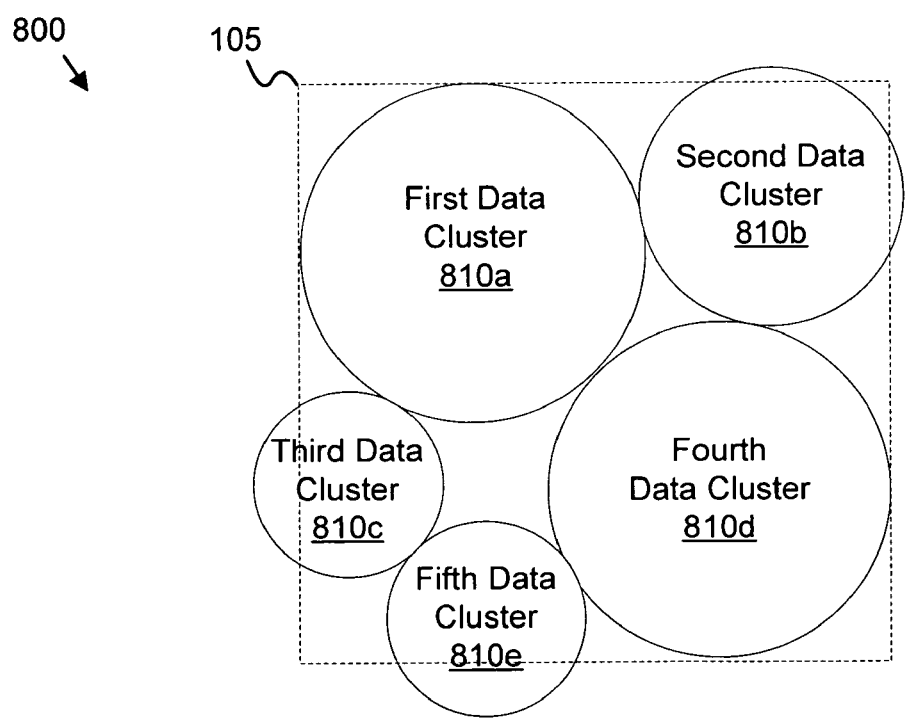
FIG. 8 is a schematic drawing illustrating one embodiment of data cluster location in accordance with the present invention.

FIG. 7 is a schematic drawing illustrating one embodiment of source data set 105 of the present invention. The source data set 105 is a two-dimensional representation of a multi-dimensional data set such as the source data set 105 of FIG. 1. FIG. 8 is a schematic drawing illustrating one embodiment of data cluster location 800 for source data set 105 of FIG. 7.

A cluster module 205 locates 605 a plurality of data clusters 810 with a center selection/clustering algorithm. The granularity of the data clusters 810 varies from data cluster 810 to data cluster 810. For example, as depicted, the first data cluster 810a has coarser granularity than the fifth data cluster 810e. A unique conversion function and norm function may be applied to each data cluster 810 to improve the overall interpolation of the source data set 105.

The present invention converts data using variable granularity data clusters 810 and conversion and norm functions optimized for each data cluster 810 to interpolate data. In addition, the present invention improves the interpolation of data such as HNS data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to interpolate data, the system comprising:
a processor;
a source data set; and
a computation module comprising
a cluster module configured to locate a plurality of data clusters within the source data set using a center selection/clustering algorithm, each data cluster comprising a center and a radius wherein each data cluster maximizes the increment to the variance between the elements of the data cluster and the data cluster and avoids numerical ill-conditioning problems for the elements of the source data set encompassed by the data cluster and minimizes the number of data clusters;
a conversion selection module configured to select a conversion function for converting each data cluster;
a norm selection module configured to select a norm function for each data cluster;
an interpolation module configured to convert each data cluster to generate converted data clusters based on the selected conversion function and the selected norm function;
a cross validation module configured to cross validate among the converted data clusters and to optimize the converted data clusters in each of a plurality of iterations, wherein the cross validation module optimizes the converted data clusters by directing at least one of: the cluster module to relocate the plurality of data clusters, the conversion selection module to select another conversion function, and the norm selection module to select another norm function, wherein one or more of the modules of the computation module includes software instructions that are executed by the processor; and
a combination module configured to combine the converted data clusters.

2. The system of claim 1, further comprising a weight module configured to determine a weight for each data cluster of each conversion function.

3. The system of claim 1, further comprising a drift module configured to adjust a conversion parameter to compensate for device drift.

4. The system of claim 1, wherein the data set comprises color space data and the interpolation module converts the color space data to color data for a specified printer.

5. A machine-readable storage medium that stores a program of machine-readable instructions executable by a digital processing apparatus to perform operations to interpolate data, the operations comprising:
locating a plurality of data clusters within a source data set using a center selection/clustering algorithm, each data cluster comprising a center and a radius wherein each data cluster maximizes the increment to the variance between the elements of the data cluster and the data cluster; and avoids numerical ill-conditioning problems for the elements of the source data set encompassed by the data cluster and minimizes the number of centers for the data set;
selecting a conversion function for converting each data cluster;
selecting a norm function for each data cluster;

converting each data cluster to generate converted data clusters based on the selected conversion function and the selected norm function;

cross validating among the converted data clusters and optimizing the converted data clusters in each of a plurality of iterations, wherein optimizing the converted data clusters comprises performing at least one of relocating the plurality of data clusters, selecting another conversion function, and selecting another norm function; and combining the converted data clusters.

6. The machine-readable medium of claim 5, wherein the instructions further comprise an operation to determine a weight for each data cluster of each conversion function.

7. The machine-readable medium of claim 5, wherein the instructions further comprise an operation to adjust a conversion parameter to compensate for device drift.

8. The machine-readable medium of claim 5, wherein the data set comprises color space data and the instructions further comprise an operation to convert the color space data to color data for a specified printer.

9. The machine-readable medium of claim 5, wherein the center selection/clustering algorithm is selected from orthogonal least squares, K-mean, and non-linear optimization algorithms.

10. The machine-readable medium of claim 5, wherein the conversion function selected from Gaussian, linear, cubic, thin plate spline, multiquadric, and inverse multiquadric functions and the norm function is an L-p norm function.

11. A method for deploying computer infrastructure, comprising integrating computer-readable code into a computing system, wherein the code in combination with the computing system is capable of performing the following:

locating a plurality of data clusters within a source data set using a center selection/clustering algorithm, each data cluster comprising a center and a radius wherein each data cluster maximizes the increment to the variance between the elements of the data cluster and the data cluster;

and avoids numerical ill-conditioning problems for the elements of the source data set encompassed by the data cluster and minimizes the number of centers for the data set;

selecting a conversion function for converting each data cluster;

selecting a norm function for each data cluster;

converting each data cluster to generate converted data clusters based on the selected conversion function and the selected norm function;

cross validating among the converted data clusters and optimizing the converted data clusters in each of a plurality of iterations, wherein optimizing the converted data clusters comprises performing at least one of relocating the plurality of data clusters, selecting another conversion function, and selecting another norm function; and combining the converted data clusters.

12. The method of claim 11, further comprising determining a weight for each data cluster of each conversion function.

13. The method of claim 11, further comprising adjusting a conversion parameter to compensate for device drift.

14. The method of claim 11, wherein the data set comprises color space data and method further comprises converting the color space data to color data for a specified printer.

* * * * *